Feb. 3, 1970    W. W. FITZGERALD ET AL    3,493,257
RESILIENT MICROCELLULAR FOAM BUMPER
Filed March 22, 1967

INVENTORS
Warren W. Fitzgerald,
Paul A. Haines,
Edward P. Harris, &
Richard F. Kienle Peter P. Kozak
ATTORNEY 3,493,257
RESILIENT MICROCELLULAR FOAM BUMPER
Warren W. Fitzgerald, Detroit, Mich., and Paul A. Haines, Vandalia, Edward P. Harris, Dayton, and Richard F. Kienle, Trotwood, Ohio, assignors to General Motors Corporation, Detroit, Mich., a corporation of Delaware
Filed Mar. 22, 1967, Ser. No. 625,055
Int. Cl. B60r 19/08
U.S. Cl. 293—71                                                                1 Claim

ABSTRACT OF THE DISCLOSURE

An impact absorbing article having a flexible high density microcellular foam body and a thin elastomeric surface coating which conceals the porous charactered of the foam body and which is capable of being elastically deformed with the body under impact without tearing or separation from the foam body may be utilized in combination with a suitable backup member as an automobile bumper, fender extension, rocker panel or the like.

---

This invention relates to a novel composite flexible impact absorbing article which is elastically deformable under substantial impact and which may be adapted for utilization as an automobile body member or the like. More particularly, this invention relates to an article having a flexible synthetic resin microcellular foam body of relatively high density and impact absorbence and an elastomeric film coating integrally bonded to said body and cooperating therewith such that the composite structure can be deformed under impact and will return to its original configuration without tearing of the surface coating or separation thereof from the body.

In many respects automobile design and manufacture presents unique problems in selection of materials of construction to the engineer. Unlike most other transportation devices, the automobile is purchased by a consumer who expects that his vehicle will be styled so that it is pleasing to the eye when new and that it will be designed such that it can be readily maintained in that condition. Among other things, the consumer wants a car which is fabricated from materials which will withstand, without significant deterioration at least, the impact of low-speed collisions, or of tire-thrown rocks and the like which chip or deform body members such as bumpers, rocker panels, and fender extensions. For many years, these body members have been formed from sheet metal and subsequently painted or chrome plated depending upon the specific application. However, sheet steel, which is employed in these applications, will permanently deform under relatively low impact and requires expensive bumping and painting or other repair work if the damaged member is to be restored to its original condition.

Solid or sponge rubber impact absorbing devices have also been used on automobiles. However, solid rubber tends to bulge under impact which ruptures or tears a surface coating. Moreover, bulk rubber requires high molding pressures. If an article the size of an automobile bumper were to be molded of bulk rubber massive and expensive equipment would be required to withstand the molding forces. On the other hand, sponge rubber is quite soft undergoing excessive deflection and tearing when subjected to the impact of a 4,000-lb. automobile traveling at a speed of up to five miles per hour.

It is an object of this invention to provide a synthetic microcellular foam impact-resistant article which is elastically deformable under relatively high impact and which may be adapted to resemble painted sheet metal.

It is a further object of this invention to provide a synthetic microcellular foam automobile body member which matches or complements the decor of the rest of the automobile body and which when adequately supported will withstand impact and normal wear and tear without appreciable deterioration.

It is a still further and more specific object of this invention to provide a composite elastomeric article having a urethane microcellular body portion and an integrally bonded elastomeric surface coating layer which cooperate in combination to deform elastically under impact without appreciable injury to the article.

These and other objects and advantages are accomplished in accordance with this invention in the case of a preferred embodiment thereof by first providing a suitable female mold having a cavity surface which defines at least a portion of the article to be produced. The mold surface is coated with a suitable release agent and then a solution of an elastomeric substance is sprayed onto the mold surface. After evaporization of the solvent, a thin film of elastomer coating remains on the mold wall. This coating may be clear or it may contain a colored pigment. The coating step may be repeated if additional thickness or color intensity is required. A foamable urethane composition is then deposited into the mold cavity against the elastometer coating. It is foamed and cured therein to produce a tough elastomeric nicrocellular foam, having a density of 25–60 pounds per cubic foot, which is integrally bonded to the elastomeric film. The individual cells are uniformly quite small and not readily distinguishable to the naked eye. In the case wherein an automobile bumper is formed, it is preferred that the foam have a density of 35 to 45 pounds per cubic foot. Finally the composite article is removed from the mold and subjected to a final curing heat treatment. When the article is to be used as an automobile bumper unit, it will be desired to provide a rigid channel beam member in the elastomeric article to support the elastomeric member and to provide means for connecting it to an automobile frame or the like. In this case, the channel beam insert is preferably positioned in the mold cavity in spaced apart relationship from the coated surface before the urethane is foamed and cured.

The above-described method produces an automobile bumper having a high density microcellular foam body member and an elastomeric surface member which may be deformed or deflected together from their original configuration under relatively high impact (equivalent to the impact of 4000-lb. automobile moving at two to five miles per hour striking a stationary object) and subsequently restore themselves thereto without appreciable damage to the article. Moreover, the surface of the elastomeric film may be smooth or irregular in accordance with the wall of the mold but it does not reflect the irregular surafce of the foam substrate structure.

A better appreciation of the invention will be gained from a detailed description of a specific embodiment thereof, reference being had to the drawing in which.

Figure 1:
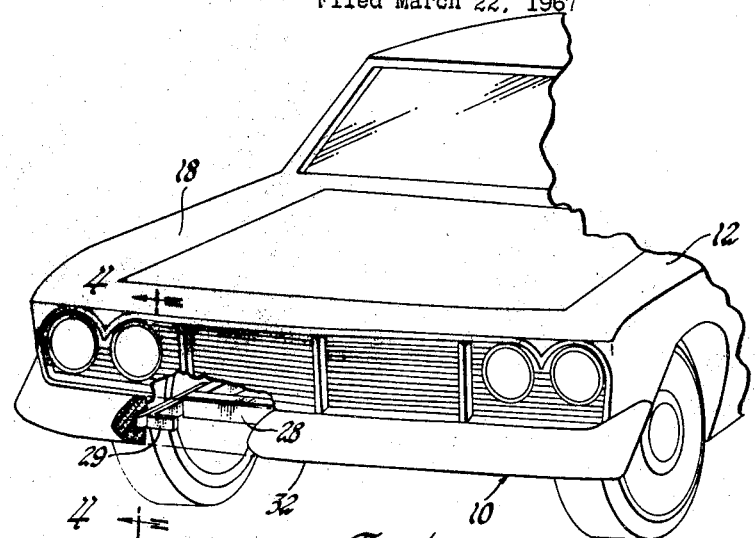
FIGURE 1 is a perspective view of the front end of an automobile, a part of which is broken away, having a bumper prepared in accordance with this invention and illustrating the principles thereof.
Figure 2:
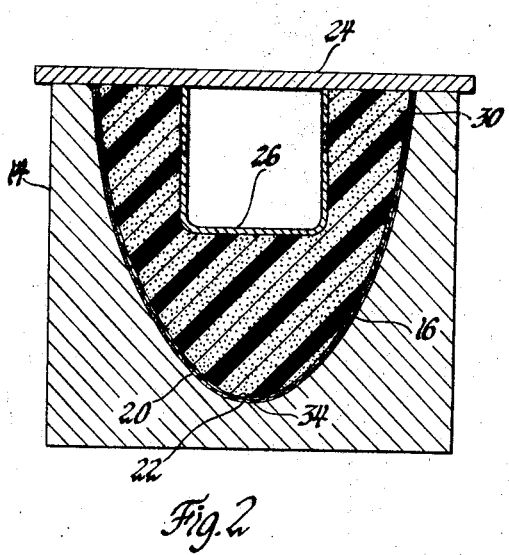
FIGURE 2 is a sectional elevation view of a mold and bumper illustrating one stage of the preparation of an embodiment of this invention.
Figure 3:
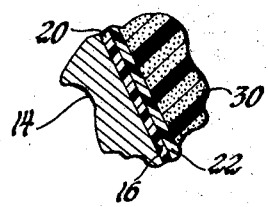
FIGURE 3 is an enlarged and more detailed sectional view of a portion of FIGURE 2 as indicated.

In the embodiment of the invention which is described herein, an automobile bumper is formed. The outer surface of the bumper is smooth and colored in a manner consistent with the decor of the sheet metal surfaces of the car. In many respects this bumper thus formed does not look like the ordinary chrome plated bumper, but rather it is styled to match the rest of the car in color and lines. The bumper 10 is shown in FIGURE 1 appended to car 12. In the preparation of the bumper, typifying the elastomeric composite article of this invention, an electroformed nicked female mold 14 is prepared which defines the exposed surface 32 of the bumper 10. It has an inner surface 16, which defines a cavity in the configuration of the bumper 10. In the case of the subject bumper, it is desired to have a smooth colored surface similar to or pleasantly matching painted sheet metal 18 which comprises much of the rest of the car body. Therefore, the surface 16 of the mold is very smooth. Surface 16 of the mold is coated with a dispersion of a Teflon-typefluorocarbon polymer in a liquid Freon. The Freon is evaporated and the residual fluorocarbon is melted onto the surface 16 by heating the mold to about 600° F. Subsequently, the mold is brought to a temperature of about 250° F. and a solution of a fully reacted urethane elastomer is sprayed onto surface 16. For the exposed surface of an automobile external body member preferably the urethane is the reaction product of a polyester polyol, formed from adipic acid and a glycol, with butane diisocyanate. This fully reacted polyurethane is dissolved in ethylene glycol monomethylether and dimethyl acetamide to obtain a suitable viscosity for spraying. No pigment is added to this first coating. The solution is sprayed onto the preheated cavity surface 16 until a thin uniform base film 20, FIGURE 3 is obtained. The solvent is evaporated from the mold surface to leave a thin coating of the fully reacted urethane elastomer. Subsequently, a second coating is applied to the clear coating already on the mold surface. The solution is basically the same type of formulation as above except that a colored light-reflecting pigment is included to give a desired color. This layer is indicated at 222, FIGURE 3. During this time, the mold 14 is maintained at a temperature of about 250° F. The colored coating is dried by evaporating the solvent. A second colored coating (not shown) may be applied, if desired, of the same composition as the first colored coating as soon as the first coating has been dried. FIGURE 3 is an enlarged fragmentary view of a portion of FIGURE 2 showing the outer clear coating 20 adjacent mold surface 16 and the color coating 22 both of which consist substantially of a fully reacted urethane elastomer. The specific composition defined above is preferred because it has excellent chemical stability when exposed to sunlight, air and salt spray. Moreover, the physical properties of the material are such that it can be elastically distorted or deformed without appreciably injuring the surface finish. The purpose of the coating is to hide the cells of the foamed body member to be molded against it. In the products we have made and found successful, the thickness of the complete coating is 6 mils or less.

Figure 4:
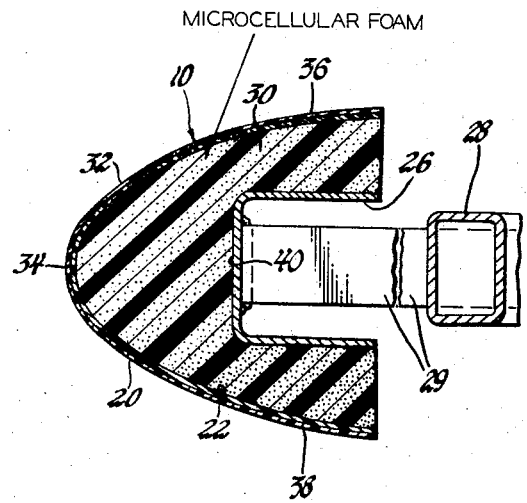
FIGURE 4 is a sectional view of the bumper and related structures taken along line 4—4 of FIGURE 1.

When the color coating has dried, which typically requires about three minutes at the temperature of the mold cavity, a mold lid 24 and a channel beam steel bumper insert 26 (shown in cross section) are located upon and in the mold cavity. The steel U-shaped beam is designed to have a moment of inertia sufficient to resist the bending moment of the impact of a 4000-lb. automobile travelling 5 m.p.h. The bumper insert 26, as shown in FIGURES 1 and 4, is also employed as shown to attach the bumper 10 to the frame 28 of the car through the medium of support springs 29, FIGURES 1 and 4. When the mold lid 24 and insert 26 have been positioned in the mold, a foamable urethane composition is poured into the mold cavity through a suitable aperture (not shown) in the mold lid. A urethane composition which may be foamed and cured to a microcellular structure having a density of 25–60 pounds per cubic foot, preferably close to about 40 pounds per cubic foot, is comprised of the following materials: 100 parts by weight of polyoxypropylene diol having a molecular weight of about 1,000, 26.7 parts by weight of 4,4'-methylene-bis (2-chloroaniline), 2 parts by weight silicone glycol surfactant, 0.5 part by weight carbon black, 0.05 part by weight distilled water, 36.5 parts by weight toluene diisocyanate (80% 2,4-toluene diisocyanate and 20% 2,6-toluene diisocyanate), and 0.3 part by weight stannous octoate. This foamable composition is poured into the mold cavity and cured for ten minutes at about 250° F., the amount of material being that which, by experiment, is found to be sufficient to fill the entire mold cavity on expansion. The material foams and expands to completely fill the cavity providing the microcellular high density urethane elastomer foamed body portion 30 which is bonded both to insert 26 and to the colored portion of the film coating 22. The bottom of the mold is water sprayed to a temperature of about 100° F. and the mold lid 24 and molded bumper 10 are removed from the cavity. The bumper structure 10 is separated from the lid 24 and given a final cure at 250° F. for one hour. Any extraneous elastomer is trimmed from the bumper and the backside is (originally adjacent the mold lid) painted preferably to match the color of the urethane layer 22. The bumper insert 26 is then welded, bolted, or otherwise attached to support spring 29, FIGURES 1 and 4, and thence to the frame 28 of the car.

Impact-resistant elastomeric articles produced in accordance with this invention, as typified by bumper 10, have a number of unique properties. They have a surface coating which conceals the porous foam substrate and which has the appearance of painted sheet metal car bodies that can be chosen at will to match or otherwise appear well with whatever other colors appear on the car. The microcellular foam substrate 30 displaces under impact, but does not bulge so as to tear or rupture a surface coating. In this respect the microcellular material differs from normal elastic material, which bulges outside of a specific portion under compression. The porous substrate also tends to distribute the load of a substantial impact whereby it is elastically displaced rather than permanently deformed. The subject elastomeric article has the advantage over other impact absorbing materials, such as sheet metal or rubber, of being able to withstand substantial impact without permanent deformation or noticeable destruction of the colored surface. In this regard, a bumper produced as described was subjected to a nimpact equivalent to that of a five miles per hour 4000-lb. automobile collision with a stationary object without permanent or even noticeable damage to the bumper. A commercial metal automobile bumper was permanently deformed and its chrome plate cracked when subjected to an equivalent impact. Moreover, the elastomeric article produced in accordance with this invention does not corrode when exposed to salt spray. It will also be appreciated that other parts of an automobtile body such as fender extensions, rocker panels and the like, prepared in accordance with this invention, will withstand stone bruises and other mild impacts without being damaged. In the event that a more severe impact is received by the member and it is permanently deformed, as would be sheet metal under similar impact, the elastomeric article may be simply and easily repaired by cutting out the damaged portion and remolding with a small amount of solid flexible material. The local surface may then be repainted.

The effective impact absorbing members of the subject bumper are the flexible synthetic resin microcellular foam portion and the rigid backup member which act in cooperation with each other to absorb substantial impacts without major damage to the composite structure. It is preferred that the support member be in the configuration of a channel beam (as shown in cross section at 26) or a closely related structural variation thereof such as an I-beam, so as to obtain a relatively high moment of inertia for resisting substantial bending moments. The length of the channel beam backup member is such that it is substantally coextensive with the bumper, at least that portion extending across the front of the car. The other dimensions of the member are designed so that the beam will be able to withstand a predeterimned impact, such as that of a 4000-lb. automobile traveling about 5 miles per hour, without permanent deformation.

The foam member of the composite bumper structure has the effect of distributing the impact over a gerater area of the beam. The high density microcellular urethane foam is particularly suitable in this capacity as it requires relatively high loads before it will undergo substantial deflection or deformation. Moreover, when it does deform, it does not bulge thereby tearing the skin portion. We have found that the urethane foam described above requires a load of about 500 p.s.i. to effect a 50% deflection or compression of a specimen which is one inch thick and having a density of 37-lb. per square inch. In accordance with our invention the foam body member preferably is capable of undergoing up to 50-65% deflection under loads of this type without rupture or other failure.

In order that the foam portion be capable of deflecting to this extent, thereby more readily distributing an impact over a substantial surface area, the foam cells must be extremely small and uniformly distributed. The cells of a mircocellular foam are scarcely visible to the naked eye, but they may be observed under a magnifying lens. We have observed that the diameter of the cells is typically in the range of about 10–200 microns. The specific size range of the cells is a function of the density of the foam. In accordance with this invention the density of the foam is at least one third and preferably about two thirds of the solid bulk density of the resin of which it is formed. In the case of a urethane foam this density is in the range of 25–60-lb. per cubic foot. As is well known in the foamable polymer art, the density of a flexible foam may be satisfactorily controlled by concentration of the blowing agent in the foamable composition. The smaller the amount of blowing agent (here the water component), the greater the density of the foam.

The physical dimensions of the bumper are determined by the design of the automobile and the impact forces that are to be withstood. When the bumper is expected to withstand the impact of a 4000-lb. automobile traveling at 5 m.p.h. with a stationary object without damage to the bumper we have found that the foamed body portion 30 (FIGURE 2 or 3) should be at least about 1½" thick between the leading impact surface 34 and the surface 40 of the rigid metal insert 26 which is perpendicular to the principal direction of impact upon the bumper. This dimension was determined to provide a five square inch contact area under full deflection when a two inch diameter object having the kinetic energy of a 5 m.p.h. 4000-lb. automobile strikes the bumper. At points where the bumper is expected to receive only a glancing blow (such as at 36 or 38 for example) the foam thickness may be reduced. Of course, it is understood that the design of any bumper is largely empirical and the specific dimensions of the bumper, particularly of the cross section parallel to the normal direction of impact (from straight ahead), may vary substantially according to the needs of the designer.

The above-described method, apparatus, and article may be modified depending upon the particular application without deviating from the spirit of this invention. For example, the number and color of the coating films applied initially to the mold are arbitrary and may be determined to fulfill a particular need. In other words, all or none of the coatings may be colored. Of course, additional coatings may be applied to the molded article. The elastomer coating does not have to be fully reacted as described above when it is initially applied to the mold. It may be cured after it is in the hot mold, or the final curing of the last applied coat may be concurrent with the foaming of the foamable resin composition so that a bond more chemical in nature is obtained between the foam member and the surface film.

In the above description, a mold was employed that was electroformed so as to have a very smooth surface. This would be preferred if the article of this invention is to be used as an automobile body component so that it will resemble painted sheet metal. However, it is apparent that the mold may have a more roughened or grained surface in other applications if desired. The reason for applying the elastomeric coating to the mold surface in the first instance is that in this way the thin elastomeric coating takes on the character of the mold surface and does not reflect the character of the foamed body portion beneath it.

The nature of the rigid insert member, of course, may vary depending upon where the impact resistant article is to be used and how it is to be attached to another structure. In the case of a rocker panel the problem is not so much one of support, but of attaching the article to the body. The foamed structure does not, however, have substantial resistance to bending moment and therefore requires some support where it may be subjected to severe blows.

Elastomeric coating layers other than urethanes may be employed. Other suitable materials, for example, from the standpoint of physical and chemical properties, are chloro-sulfonated polyethylene and chlorinated polyethylene. Other elastomers may be used so long as they do not yellow or otherwise deteriorate in the environment in which the article is to be used and they have elastomeric properties compatible with the microcellular foam substrate. In this regard, it is expected that the composite flexible portion of the bumper be capable of deforming inwardly up to as much as 50 to 65% and returning to its normal configuration without the surface coating being torn, destroyed, or separated from the foam body member. Less demanding physical requirements may be encountered in other applications.

While this method and article have been described in terms of a specific embodiment, it will be appreciated that other forms may readily be adapted by those skilled in the art and the invention should be considered limited only by the following claim.

We claim:

1. An automobile bumper unit comprising in combination: an elongated channel beam member adapted to be affixed to the automobile, defining an outer surface generally perpendicular to the principal direction of impact on the bumper unit, and of moment of inertia and material sufficient to resist bending moments of predetermined impacts when mounted on the automobile; a layer of microcellular foam synthetic resin enveloping said surface of the beam member, said layer being composed of foamed polyurethane having a density of about 35–45 pounds per cubic foot and foam cells uniformly less than about 200 microns in diameter, said layer further being of the order of at least 1½" thick in a direction perpendicular to said beam surface; and a layer of nonfoamed resin enveloping the surface of said first mentioned layer, said last layer being of the order of .006" thick and formed principally of polyurethane material, whereby impact on the bumper unit compresses said microcellular foam resin layer and said enveloping nonfoamed resin layer to deform them, said layers ultimately returning to their original configuration.

(References on following page)

References Cited

UNITED STATES PATENTS

| | | | |
|---|---|---|---|
| 1,980,867 | 11/1934 | Lusse | 293—19 |
| 2,274,440 | 2/1942 | Tozier | 293—19 XR |
| 3,074,751 | 1/1963 | Gerin | 293—19 |
| 3,116,778 | 1/1964 | Herzegh et al. | 152—330 |
| 3,140,111 | 7/1964 | Dabroski | 293—69 XR |
| 2,188,082 | 1/1940 | Imhofe | 293—71 |
| 2,829,915 | 4/1958 | Claveau | 293—71 |
| 2,926,904 | 3/1960 | Erlbacher | 293—71 XR |
| 2,902,072 | 9/1959 | Reuters | 152—330 |
| 3,022,810 | 2/1962 | Lambe | 152—157 |

ARTHUR L. LA POINT, Primary Examiner

H. BELTRAN, Assistant Examiner

U.S. Cl. X.R.

293—63

PO-1050
(5/69)

UNITED STATES PATENT OFFICE
CERTIFICATE OF CORRECTION

Patent No. __3,493,257__  Dated __February 3, 1970__

Inventor(s) __Warren W. Fitzgerald, Paul A. Haines, Edward P. Harris and Richard F. Kienle__

It is certified that error appears in the above-identified patent and that said Letters Patent are hereby corrected as shown below:

Column 1, line 15, "characted" should read -- character --.

Column 2, line 29, "elastometer" should read -- elastomer --; line 30, "nicrocellular" should read -- microcellular --; line 52, before "4000-lb." insert -- a --.

Column 3, line 17, "nicked" should read -- nickel --; line 26, "Teflon-typefluorocarbon" should read -- Teflon-type fluorocarbon --; line 48, "222" should read -- 22 --.

Column 4, line 57, "a nimpact" should read -- an impact --.

Column 5, line 15, "predeterimned" should read -- predetermined --; line 19, "gerater" should read -- greater --; line 36, "mircocellular" should read -- microcellular --.

Column 6, line 31, "subjected" should read -- subject --.

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents